US011921407B2

(12) United States Patent
Takehana et al.

(10) Patent No.: US 11,921,407 B2
(45) Date of Patent: Mar. 5, 2024

(54) FIXING DEVICE, PROJECTION OPTICAL DEVICE, AND PROJECTOR

(71) Applicant: SEIKO EPSON CORPORATION, Tokyo (JP)

(72) Inventors: Naoto Takehana, Azumino (JP); Hirofumi Okubo, Matsumoto (JP); Kosho Kamijo, Yamagata-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 17/579,706

(22) Filed: Jan. 20, 2022

(65) Prior Publication Data

US 2022/0229351 A1 Jul. 21, 2022

(30) Foreign Application Priority Data

Jan. 20, 2021 (JP) ................................ 2021-006964

(51) Int. Cl.
*G03B 21/14* (2006.01)
*G02B 7/02* (2021.01)
*G02B 27/62* (2006.01)

(52) U.S. Cl.
CPC ........... *G03B 21/142* (2013.01); *G02B 7/023* (2013.01); *G02B 27/62* (2013.01); *G03B 21/145* (2013.01)

(58) Field of Classification Search
CPC ................ G03B 21/142; G03B 21/145; G03B 21/2013; G03B 21/2033; G03B 21/2053; G02B 27/62; G02B 27/64; G02B 27/646; G02B 27/648; G02B 7/021; G02B 7/022; G02B 7/023; G02B 7/025; H04N 9/317; H04N 9/3132; H04N 9/3141; H04N 9/3152; H04N 9/3164
See application file for complete search history.

(56) References Cited

U.S. PATENT DOCUMENTS 8,752,968 B2 6/2014 Saito et al.
2012/0242966 A1 9/2012 Saito et al.
2014/0092371 A1 * 4/2014 Nemura ................. G02B 7/023 353/101
2018/0046068 A1 * 2/2018 Hatano ................ G02B 15/144
2018/0088297 A1 * 3/2018 Komiyama ............ G02B 7/021
2019/0199885 A1 * 6/2019 Nakahara ............... H04N 1/295
2019/0235362 A1 * 8/2019 Takehana ............. G03B 21/142

FOREIGN PATENT DOCUMENTS

JP 2008-180749 A 8/2008
JP 2012-198463 A 10/2012
JP 2019-211639 A 12/2019

* cited by examiner

*Primary Examiner* — Sultan Chowdhury
(74) *Attorney, Agent, or Firm* — Dority & Manning, P.A.

(57) ABSTRACT

A fixing device that fixes, to a light emitting device that emits light, a lens barrel included in a projection optical device and holding a plurality of lenses includes a first tube member, a contact section provided on an outer side of the first tube member and in contact with a holding section included in the light emitting device, and a pressing mechanism provided to be opposed to the contact section and configured to press the holding section toward the contact section when the fixing device is attached to the light emitting device.

14 Claims, 9 Drawing Sheets

6
CX
61
62
72
721
71
(712)
742
75
7
76
77
75
74
75
73
76A
74A
71
(712)
+Z
+Y
+X

FIXING DEVICE, PROJECTION OPTICAL DEVICE, AND PROJECTOR

The present application is based on, and claims priority from JP Application Ser. No. 2021-006964, filed Jan. 20, 2021, the disclosure of which is hereby incorporated by reference herein in its entirety.

BACKGROUND

1. Technical Field

The present disclosure relates to a fixing device, a projection optical device, and a projector.

2. Related Art

There has been known a projector including a light source, a light modulating device that modulates light emitted from the light source and forms an image corresponding to image information, and a projection optical device that enlarges and projects the formed image onto a projection surface.

In the projection optical device, when an optical distance from a fixing section to the projector to an end portion on a light emission side of the projection optical device is long, it is likely that the positions of optical components move because of the influence of a bend due to the weight of the projection optical device or vibration from the outside and optical performance of the projection optical device is deteriorated. Therefore, a firmer fixing structure has been desired.

To cope with such a problem, there has been known a projector including a projection lens unit in which a convergence optical system, a reflection mirror, and a diffusion optical system are integrally assembled to a common holding member having high rigidity (see, for example, JP-A-2008-180749 (Patent Literature 1)).

There has been known a projector including a lens holding mechanism provided on the outside of the projector and holding an interchangeable lens while suppressing tilt and collapse (see, for example, JP-A-2019-211639 (Patent Literature 2)).

In the projector described in Patent Literature 1, since high rigidity is required of the holding member to which the convergence optical system, the reflection mirror, and the diffusion optical system are assembled, the weight of the holding member and the protection lens unit tends to be large. Since the holding member needs to be accurately configured, manufacturing difficulty of the projection lens unit is high and manufacturing cost of the projection lens unit is also high.

In the projector described in Patent Literature 2, since it is necessary to separately provide the lens holding mechanism, it is troublesome to attach the lens holding mechanism to the projector. Besides, it is necessary to adjust disposition of the lens holding mechanism according to a setting direction of the projector. For example, in a reverse placement posture in which the projector is placed vertically reversely from a normal placement posture, it is likely that the interchangeable lens cannot be held by the lens holding mechanism.

Therefore, there has been a desire for another configuration that can fix the projection optical device to the projector.

SUMMARY

A fixing device according to a first aspect of the present disclosure fixes, to a light emitting device that emits light, a lens barrel included in a projection optical device and holding a plurality of lenses, and the fixing device includes: a first tube member; a contact section provided on an outer side of the first tube member and in contact with a holding section included in the light emitting device; and a pressing mechanism provided to be opposed to the contact section and configured to press the holding section toward the contact section when the fixing device is attached to the light emitting device.

A projection optical device according to a second aspect of the present disclosure includes: the fixing device according to the first aspect; a plurality of lenses; and a lens barrel holding the plurality of lenses and attached to the fixing device.

A projection optical device according to a third aspect of the present disclosure is detachably attached to a light emitting device that emits light, and the projection optical device includes: a plurality of lenses; a lens barrel holding the plurality of lenses; a contact section in contact with a holding section included in the light emitting device; and a pressing mechanism provided to be opposed to the contact section and configured to press the holding section toward the contact section when the projection optical device is attached to the light emitting device.

A projector according to a fourth aspect of the present disclosure includes: a light emitting device configured to emit light; and the projection optical device according to the third aspect. The light emitting device includes: a light source; a light modulating device configured to modulate light emitted from the light source; and an attachment mechanism including a holding section, the projection optical device being attached to the attachment mechanism.

DESCRIPTION OF EXEMPLARY EMBODIMENTS

An embodiment of the present disclosure is explained below with reference to the drawings.

Schematic Configuration of a Projector

Figure 1:
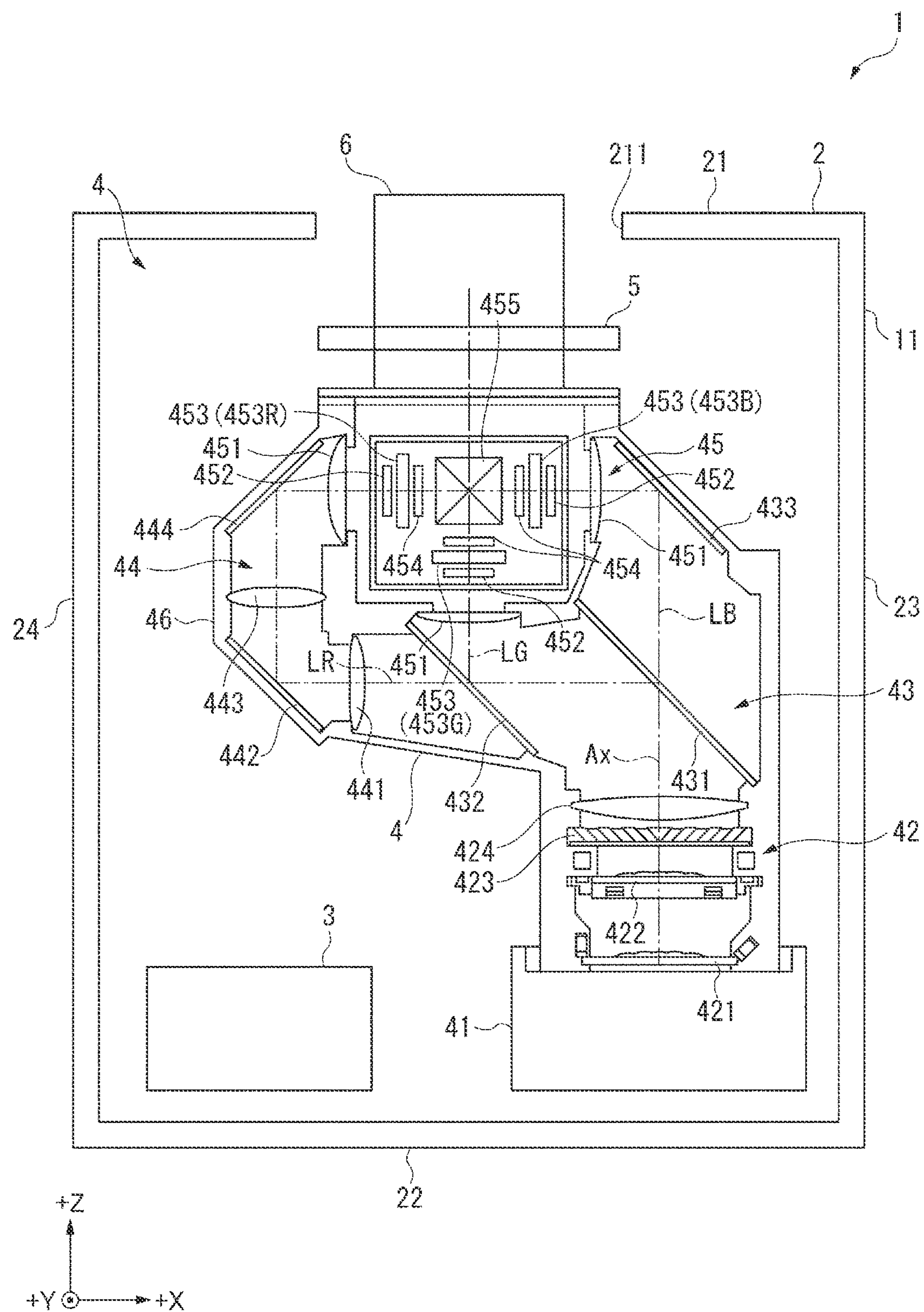
FIG. 1 is a schematic diagram showing the configuration of a projector according to an embodiment.

FIG. 1 is a schematic diagram showing the configuration of a projector 1 according to this embodiment.

The projector 1 according to this embodiment modulates, according to image information, light emitted from a light source 41 and enlarges and projects the modulated light onto a projection surface such as a screen. The projector 1 includes, as shown in FIG. 1, a light emitting device 11 and a projection optical device detachably attached to the light emitting device 11.

Configuration of the Light Emitting Device

The light emitting device 11 emits image light, which is light for forming an image. The light emitting device 11 includes an exterior housing 2, a control device 3, and an image generating device 4. Besides, the light emitting device 11 includes an attachment mechanism 5 (see FIG. 5) for attaching the projection optical device 6 and further includes, although not shown in FIG. 1, a power supply device that supplies electric power to electronic components configuring the projector 1 and a cooling device that cools cooling targets configuring the projector 1.

The configuration of the attachment mechanism 5 is explained in detail below.

Configuration of the Exterior Housing

The exterior housing 2 houses the control device 3 and the image generating device 4 on the inside. The exterior housing 2 includes a front surface 21, a rear surface 22, a left side surface 23 and a right side surface 24, and a top surface and a bottom surface not shown in FIG. 1 and is formed in a substantially rectangular parallelepiped shape. In the exterior housing 2, although not shown in FIG. 1, an operation panel, a light receiving section, and a connection terminal coupled to the control device 3 are disposed in the exterior housing 2.

On the front surface 21, an opening section 211, through which the projection optical device 6 is inserted, is provided. The attachment mechanism 5 (see FIG. 5) is provided on the inner side of the front surface 21.

Configuration of the Control Device

The control device 3 includes an arithmetic processing device such as a CPU (Central Processing Unit) and controls the projector 1. For example, the control device 3 causes the projector 1 to operate based on an operation signal input from the operation panel and an operation signal of a remote controller received by a light receiving section. When an imaging device is coupled to the projector 1, the control device 3 is capable of carrying out, based on a captured image input from the imaging device, adjustment of a projected image projected onto the projection surface by the projection optical device 6. For example, the control device 3 executes, based on the captured image captured by the imaging device, adjustment processing such as keystone correction for correcting trapezoidal distortion of the projected image and color correction for the projected image.

Configuration of the Image Generating Device

The image generating device 4 generates image light corresponding to image information (including an image signal) input from the control device 3 and emits the Generated image light to the projection optical device 6. The image generating device 4 includes a light source 41, a uniformizing device 42, a color separating device 43, a relay device 44, an image forming device 45, and an optical component housing 46.

The light source 41 emits illumination light to the uniformizing device 42. As the configuration of the light source 41, for example, a configuration including a solid-state light source that emits blue light, which is excitation light, and a wavelength conversion element that performs wavelength conversion for converting a part of the blue light emitted from the solid-state light source into fluorescent light including green light and red light can be illustrated. As other configurations of the light source 41, a configuration including a light source lamp such as an ultra-high pressure mercury lamp as a light source can be illustrated and a configuration including solid-state light sources that individually emit blue light, green light, and red light can be illustrated.

The uniformizing device 42 uniformizes illuminance of a light beam made incident from the light source 41. The uniformizing device 42 includes a first lens array 421, a second lens array 422, a polarization conversion element 423, and a superimposition lens 424.

The color separating device 43 separates the light beam made incident from the uniformizing device 42 into red light LR, green light LG, and blue light LB. The color separating device 43 includes dichroic mirrors 431 and 432 and a reflection mirror 433.

The relay device 44 is provided in an optical path of the red light LR longer than an optical path of the blue light LB and an optical path of the green light LG and suppresses a loss of the red light LR. The relay device 44 includes an incident side lens 441, a reflection mirror 442, a relay lens 443, and a reflection mirror 444. Color light having an optical path longer than optical paths of the other color lights may be assumed to be the blue light LB and the relay device 44 may be provided in the optical path of the blue light LB.

The image forming device 45 modulates the blue light LB, the green light LG, and the red light LR made incident thereon and combines the modulated color lights to form image light. The image forming device 45 includes a field lens 451, an incident-side polarizing plate 452, a light modulating device 453, and an emission-side polarizing plate 454 provided for each of the color lights LB, LG, and LR and one light combining device 455.

The light modulating device 453 modulates, according to image information, light emitted from the light source 41. The light modulating device 453 includes a light modulating device for blue 453B that modulates the blue light LB, a light modulating device for green 453G that modulates the green light LG, and a light modulating device for red 453R that modulates the red light LR in this embodiment, the light modulating device 453 is configured by a transmission-type liquid crystal panel. A liquid crystal light valve is configured by the incident-side polarizing plate 452, the light modulating device 453, and the emission-side polarizing plate 454.

The light combining device 455 combines the color lights modulated by the light modulating devices 453B, 453G, and 453R to form image light. The light combining device 455 emits the formed image light to the projection optical device 6. The light combining device 455 can be configured by a cross dichroic prism. However, not only this, but the light combining device 455 can also be configured by, for example, a plurality of dichroic mirrors.

The optical component housing 46 holds the devices 42 to 44 and the field lens 451. An illumination light axis Ax, which is an optical axis in design, is set in the image generating device 4. The optical component housing 46 holds the devices 42 to 44 and the field lens 451 in predetermined positions on the illumination light axis Ax. The light source 41, the image forming device 45, and the projection optical device 6 are disposed in predetermined positions on the illumination light axis Ax.

In the following explanation, three directions orthogonal to one another are represented as a +X direction, a +Y direction, and a +Z direction. The +Z direction is assumed no be a direction from the rear surface 22 to the front surface 21 and an emitting direction of image light by the image generating device 4. The +Y direction is assumed to be a direction from a bottom surface to a top surface. A left direction in the case in which the projector 1 is viewed from the +Z direction such that the +Y direction is on the upper side is assumed to be the +X direction.

The opposite direction of the +X direction is represented as a −X direction, the opposite direction of the +Y direction is represented as a −Y direction, and the opposite direction of the +Z direction is represented as a −Z direction.

Orthogonal indicates crossing at a right angle.

Configuration of the Projection Optical Device

Figure 2:
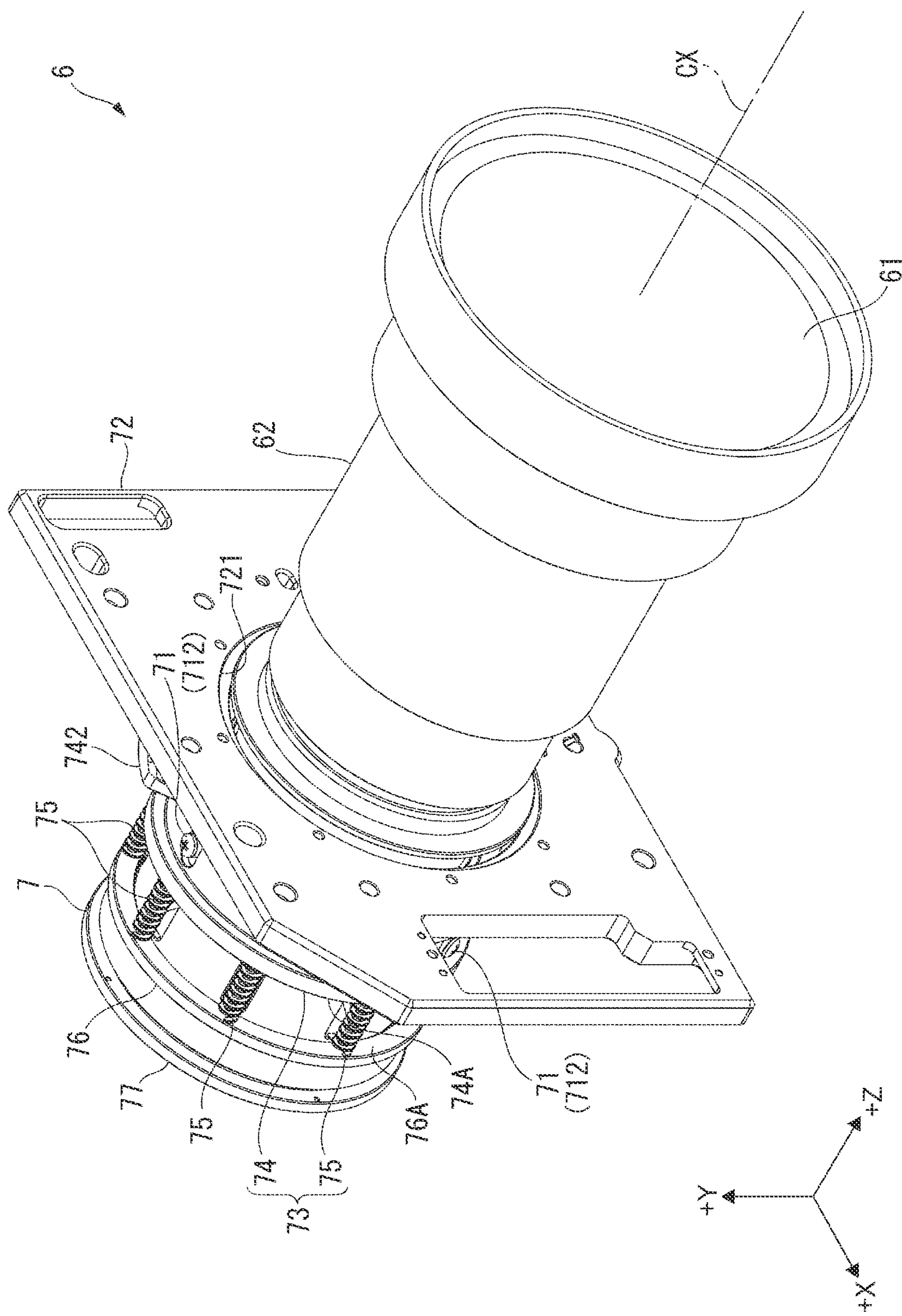
FIG. 2 is a perspective view showing a projection optical device according to the embodiment.
Figure 3:
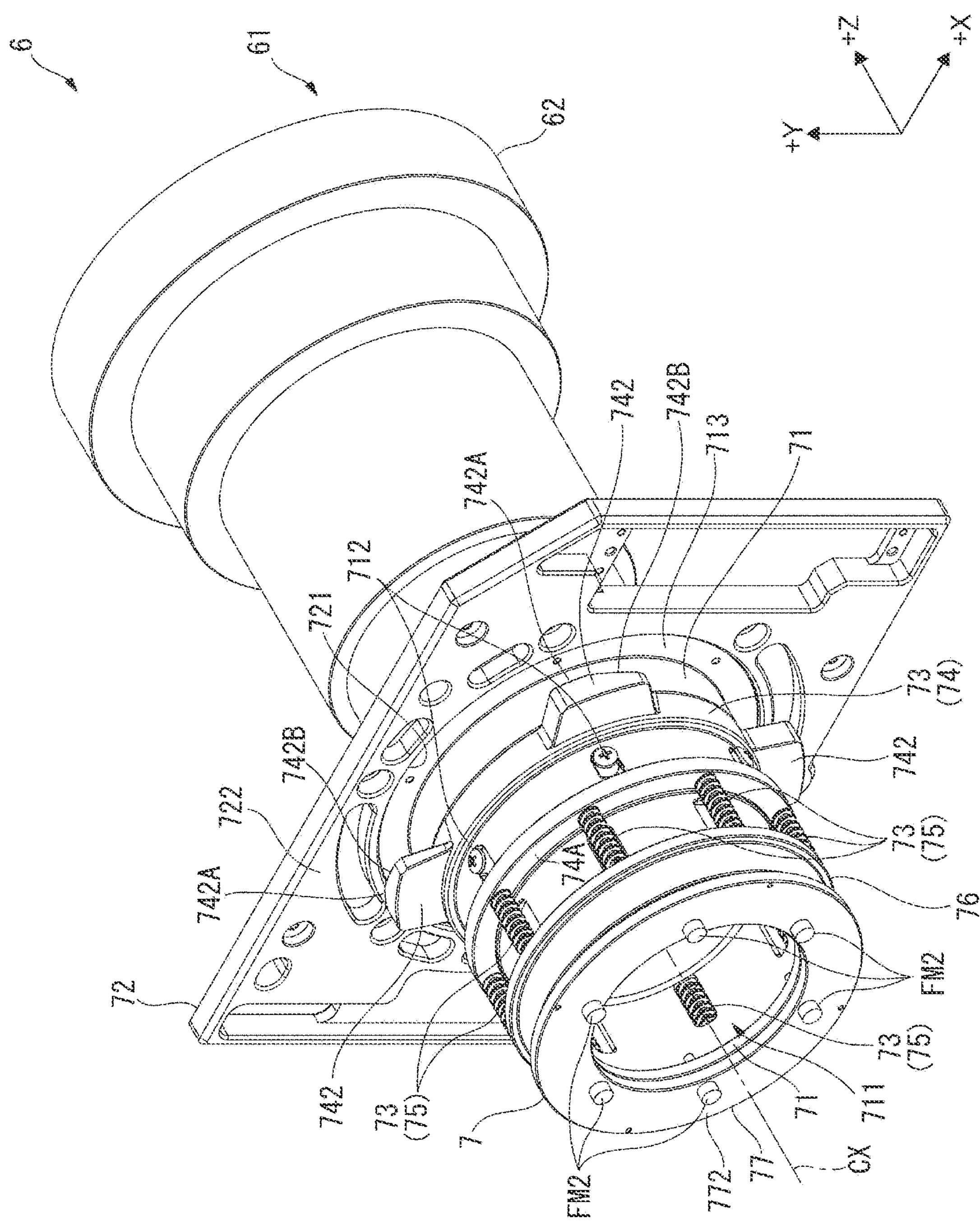
FIG. 3 is a perspective view showing the projection optical device according to the embodiment.

FIGS. 2 and 3 are perspective views showing the projection optical device 6. Specifically, FIG. 2 is a perspective view of the projection optical device 6 viewed from an incident side of image light. FIG. 3 is a perspective view of the projection optical device 6 viewed from an emission side of the image light.

The projection optical device 6 projects light emitted from the light emitting device 11. That is, the projection optical device 6 projects image light made incident from the image generating device 4 onto the projection surface.

The projection optical device 6 includes, as shown in FIGS. 2 and 3, a plurality of lenses 61, a lens barrel 62, and a fixing device 7 that fixes the lens barrel 62 to the light emitting device 11.

The plurality of lenses 61 enlarges and projects image light emitted from the light emitting device 11. The plurality of lenses 61 may include a focus lens and a zoom lens. The focus lens is provided in the lens barrel 62 to be capable of moving along the optical axis of the focus lens. The focus lens adjusts a focus state of an image based on the image light projected onto the projection surface. The zoom lens is provided in the lens barrel 62 to be capable of moving along the optical axis of the zoom lens. The zoom lens adjusts a zoom state of the image based on the image light projected onto the projection surface.

The lens barrel 62 holds the plurality of lenses 61. The lens barrel 62 is formed in a substantially columnar shape.

Configuration of the Fixing Device

Figure 4:
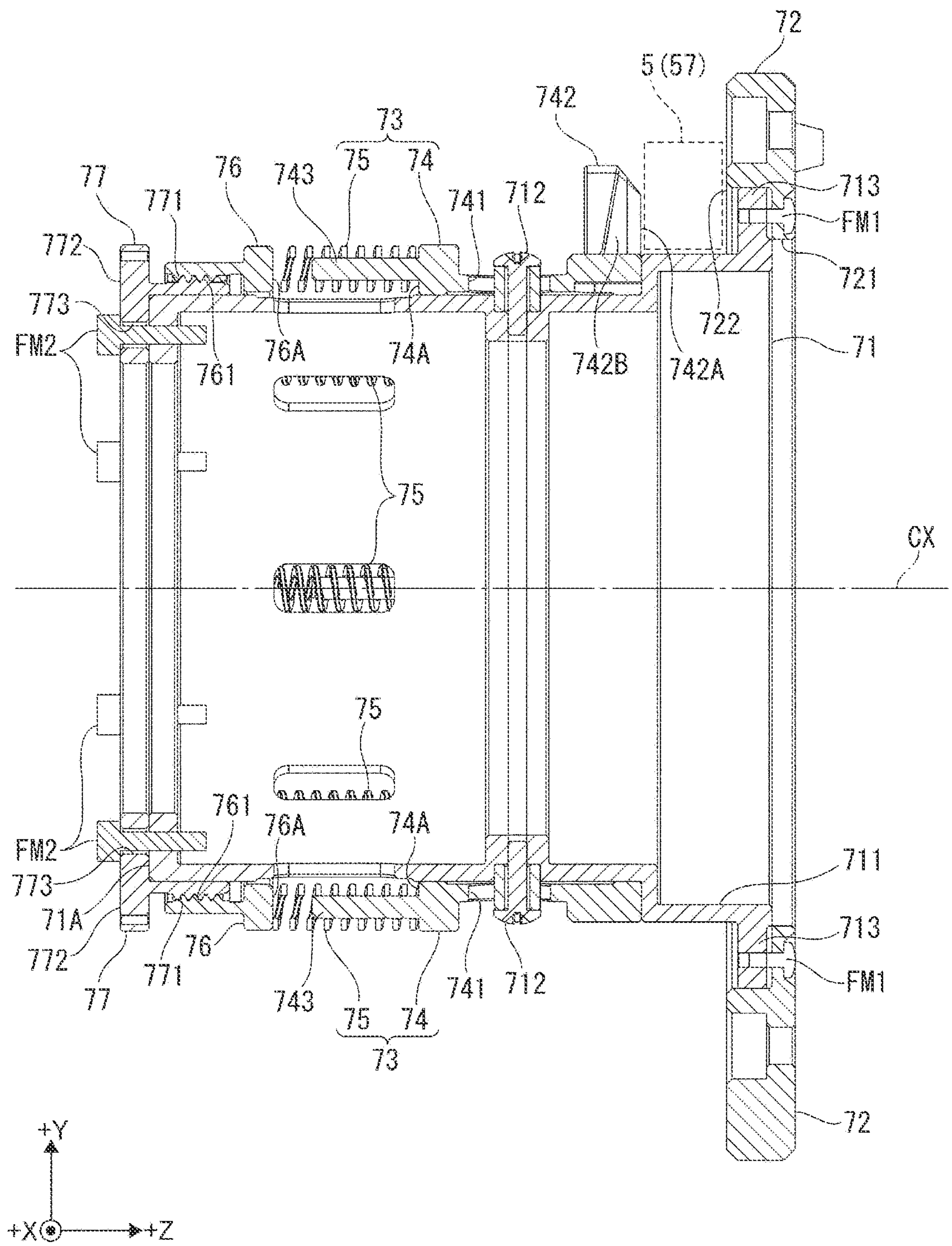
FIG. 4 is a sectional view showing a fixing device according to the embodiment.

FIG. 4 is a sectional view showing the fixing device 7. Specifically, FIG. 4 is a diagram showing a cross section of the fixing device 7 extending along a YZ plane and including a center axis CX of a first tube member 71.

The fixing device 7 reinforces coupling of the projection optical device 6 and the light emitting device and attaches the projection optical device 6 to the attachment mechanism 5 of the light emitting device 11. As shown in FIGS. 2 and 3, a portion on an incident side of image light in the lens barrel 62 is fit in the fixing device 7 and the lens barrel 62 is attached to the fixing device 7 such that the portion of the lens barrel 62 is covered, whereby the fixing device 7 couples the projection optical device 6 to the light emitting device 11. That is, the fixing device 7 fixes the lens barrel 62 included in the projection optical device 6 to the light emitting device 11.

The fixing device 7 includes, as shown in FIGS. 2 to 4, a first tube member 71, a frame member 72, a pressing mechanism 73, a locking member 76 and a meshing member 77.

Configuration of the First Tube Member

The first tube member 71 is a tubular member functioning as a main body of the fixing device 7. A portion in the −Z direction of the lens barrel 62 is fit in the first tube member 71. The lens barrel 62 is attached to the first tube member 71. The center axis CX of the first tube member 71 coincides with the center axis of the lens barrel 62. Since the projection optical device 6 is disposed along the +Z direction, the center axis CX of the first tube member 71 and the center axis of the lens barrel 62 extend along the +Z direction.

The first tube member includes a through-opening 711, a restricting section 712, and a projecting section 713.

The through-opening 711 pierces through the first tube member 71 along the +Z direction. The through-opening 711 is formed in a substantially circular shape when viewed from the +Z direction. A portion in the −Z direction in the lens barrel 62 is inserted into the inside of the through-opening 711.

The restricting section 712 projects to a radial direction outer side centering on the center axis CX. The restricting section 712 restricts a turn centering on the center axis CX of a second tube member 74 explained below. In this embodiment, the restricting section 712 is configured by a screw fixed to the outer circumferential surface of the first tube member 71.

The projecting section 713 is provided in a ring shape at the end portion in the +Z direction in the first tube member 71. That is, the projecting section 713 projects from the end portion in the +Z direction in the first tube member 71 to the radial direction outer side centering on the center axis CX. The frame member 72 is fixed to the projecting section 713.

Configuration of the Frame Member

The frame member 72 is a member formed in a plate shape and is provided on the outer side of the first tube member 71 and includes an opening section 721 through which the lens barrel 62 is inserted. The frame member 72 is fixed to the projecting section 713 of the first tube member 71 by fixing members FM1 such as screws. As shown in FIG. 2, the frame member 72 is formed in a substantially rectangular shape when viewed from the +Z direction and extends to the outer side from the lens barrel 62.

A part in the −Z direction in the frame member 72 is a contact section 722 in contact with a holding section of the attachment mechanism 5 included in the light emitting device 11 explained below. That is, the frame member 72 includes the contact section 722 in a position opposed to the pressing mechanism 73 in the frame member 72. Specifically, the contact section 722 is opposed to, in the +Z direction, a pressing section 742 included in the second tube member 74 of the pressing mechanism 73. In other words, the contact section 722 is disposed in the +Z direction with respect to the pressing section 742. When the frame member 72 is not disposed in the −Z direction with resect to the projecting section 713, the surface in the −Z direction in the projecting section 713 may be used as a contact section in contact with the holding section 57.

Configuration of the Pressing Mechanism

The pressing mechanism 73 is provided to be opposed to the contact section 722. When the fixing device 7 is attached to the light emitting device 11, the pressing mechanism 73 presses the holding section 57 (see FIG. 8) of the attachment mechanism 5 of the light emitting device 11 toward the contact section 722. That is, the pressing mechanism 73 is provided to be opposed to the contact section 722. When the projection optical device 6 is attached to the light emitting device 11, the pressing mechanism 73 presses the holding section 57 (see FIG. 8) toward the contact section 722. The pressing mechanism 73 sandwiches the holding section 57 between the pressing mechanism 73 and the contact section 722.

The pressing mechanism 73 includes the second tube member 74 and an urging section 75 as shown in FIGS. 2 to 9.

Configuration of the Second Tube Member

As shown in FIGS. 3 and 4, the second tube member is a tubular member provided concentrically with the first tube member 71 on the outer side of the first tube member 71. That is, the center axis of the second tube member 74 coincides with the center axis CX of the first tube member 71.

The second tube member 74 includes a long hole 741, a pressing section 742, and a disposing section 743.

The long hole 741 is a long hole long in the +Z direction. The long hole 741 pierces through the second tube member 74 along a radial direction centering on the center axis CX. A plurality of long holes 741 are provided at equal intervals in a circumferential direction centering on the center axis CX. Specifically, six long holes 741 are provided in the second tube member 74. The restricting section 712 is inserted through the long hole 741, whereby a turn of the second tube member 74 centering on the center axis CX is restricted and a slide of the second tube member 74 along the center axis CX is allowed. That is, the second tube member 74 is movable along the center axis CX.

The pressing section 742 is a projecting portion projecting to the radial direction outer side centering on the center axis CX from a portion in the +Z direction in the second tube member 74. A plurality of pressing sections 742 are provided at equal intervals in the circumferential direction centering on the center axis CX. In this embodiment, four pressing sections 742 are provided. When the projection optical device 6 attached to the attachment mechanism 5 of the light emitting device 11, the pressing section 742 comes into contact with the holding section 57 and presses the holding section 57 to the contact section 722 side. The surface in the +Z direction in the pressing section 742 includes a pressing surface 742A and a guide surface 7425.

The pressing surface 742A is provided in a position opposed to the contact section 722 in the pressing section 742. The pressing surface 742A comes into contact with the holding section 57 and presses the holding section 57 with an urging force of the urging section 75. The pressing surface 742A is parallel to an XY plane orthogonal to the center axis CX.

The guide surface 7425 is adjacent to the pressing surface 742A in the circumferential direction centering on the center axis CX and is provided continuously to the pressing surface 742A. Specifically, the guide surface 742B is provided continuously to the pressing surface 742A in a counterclockwise position with respect to the pressing surface 742A when viewed from the +Z direction. The guide surface 7425 is inclined with respect to the circumferential direction centering on the center axis CX to further separate from the contact section 722 as being further away, from the pressing surface 742A. That is, the guide surface 742B is inclined to be further located in the −Z direction as further separating from the pressing surface 742A in the circumferential direction of the center axis CX when viewed from the +Z direction. When an operation section 59 explained below is operated and the holding section 57 is turned clockwise when viewed from the +Z direction, the guide surface 742B guides the holding section 57 to between the pressing surface 742A and the contact section 722. That is, the guide surface 742B guides the holding section 57 to the pressing surface 742A.

The disposing section 743 is a pin-like section projecting in the −Z direction from the surface in the −Z direction in the second tube member 74. A plurality of disposing sections 743 are provided at equal intervals in the circumferential direction centering on the center axis CX. The disposing section 743 is inserted into the inside of the urging section 75, whereby the urging section 75 is disposed in the disposing section 743. At this time, the end portion in the +Z direction in the urging section 75 is in contact with an end face 74A in the −Z direction in the second tube member 74.

In this embodiment, six disposing sections 743 are provided.

Configuration of the Urging Section

The urging section 75 urges the second tube member 74 in the +Z direction. That is, the urging section 75 urges the pressing section 742 of the second tube member 74 to the contact section 722 side. In this embodiment, six urging sections 75 are provided in the fixing device 7. The urging section 75 is a compression coil spring. The end portion in the +Z direction in the urging section 75 is in contact with the end face 75. The end portion in the −Z direction in the urging section 75 is in contact with the locking member 76. That is, the urging section 75 is disposed between the second tube member 74 and the locking member 76.

Configuration of the Locking Member

The locking member 76 locks the urging section 75 disposed in the disposing section 743. The locking member 76 is a tubular member concentric with the first tube member 71 and provided on the outer side of the first tube member 71. An end face 76A in the +Z direction in the locking member 76 locks the end portion in the −Z direction in the urging section 75.

As shown in FIG. 4, the locking member 76 includes, in a part in the −Z direction, a meshing section 761 that meshes with the meshing member 77. The meshing section 761 is a spiral screw groove extending along the circumferential direction centering on the center axis CX.

Configuration of the Meshing Member

In a state in which the meshing member 77 meshes with the locking member 76, the meshing member 77 is fixed to a surface 71A in the −Z direction in the first tube member 71 by fixing members FM2 such as screws. The meshing member 77 is a cylindrical member centering on the center axis CX and is concentric with the first tube member 71 and is disposed on the outer side of the first tube member 71. The meshing member 77 includes a meshing section 771, an attaching section 772, and a plurality of hole sections 773.

The meshing section 771 is provided on the outer circumferential surface of a part in the +Z direction in the meshing member 77. The meshing section 771 is a spiral screw thread extending along the circumferential direction centering on the center axis CX. In a state in which the meshing section 771 and the meshing section 761 are meshed, the meshing member 77 is turned clockwise when viewed from the −Z direction, whereby the meshing member 77 moves in the direction. On the other hand, in a state in which the meshing section 771 and the meshing section 761 are meshed, the meshing member 77 is turned counterclockwise when viewed from the −Z direction, whereby the meshing member 77 moves in the −Z direction.

The attaching section 772 configures the end portion in the −Z direction in the meshing member 77. The attaching section 772 projects to the radial direction inner side centering on the center axis CX from the end portion in the −Z direction in the meshing section 771.

The plurality of hole sections 773 pierce through the attaching section 772 along the +Z direction. The fixing member FM2 such as a screw is inserted through each of the plurality of hole sections 773 along the +Z direction. The fixing members FM2 inserting through the hole sections 773 are fixed to the surface 71A, whereby the meshing member 77 meshing with the locking member 76 is fixed to the first tube member 71.

The urging section 75 adopted in the fixing device is a compression coil spring having relatively large repulsion. Therefore, it is not easy to attach the urging section 75 to the fixing device 7 while keeping the urging section 75 in contact with the second tube member 74 to cause an urging force to act on the second tube member 74.

In contrast, the locking member 76 in contact with the end portion in the −Z direction in the urging section 75 and the meshing member 77 meshing with the locking member 76 are provided in the first tube member 71 and, in a state in which the meshing member 77 is turned clockwise when viewed from the −Z direction and the position of the meshing member 77 is adjusted, the meshing member 77 is fixed to the tube member 71 by the fixing members FM2.

Consequently, the urging section 75 having relatively large repulsion can be provided in the fixing device 7 in a state in which an urging force acts on the second tube member 74. It is possible to adjust the urging force of the urging section 75 acting on the second tube member 74 by adjusting the position of the locking member 76 at the time when the meshing member 77 is fixed to the first tube member 71.

Configuration of the Attachment Mechanism

Figure 5:
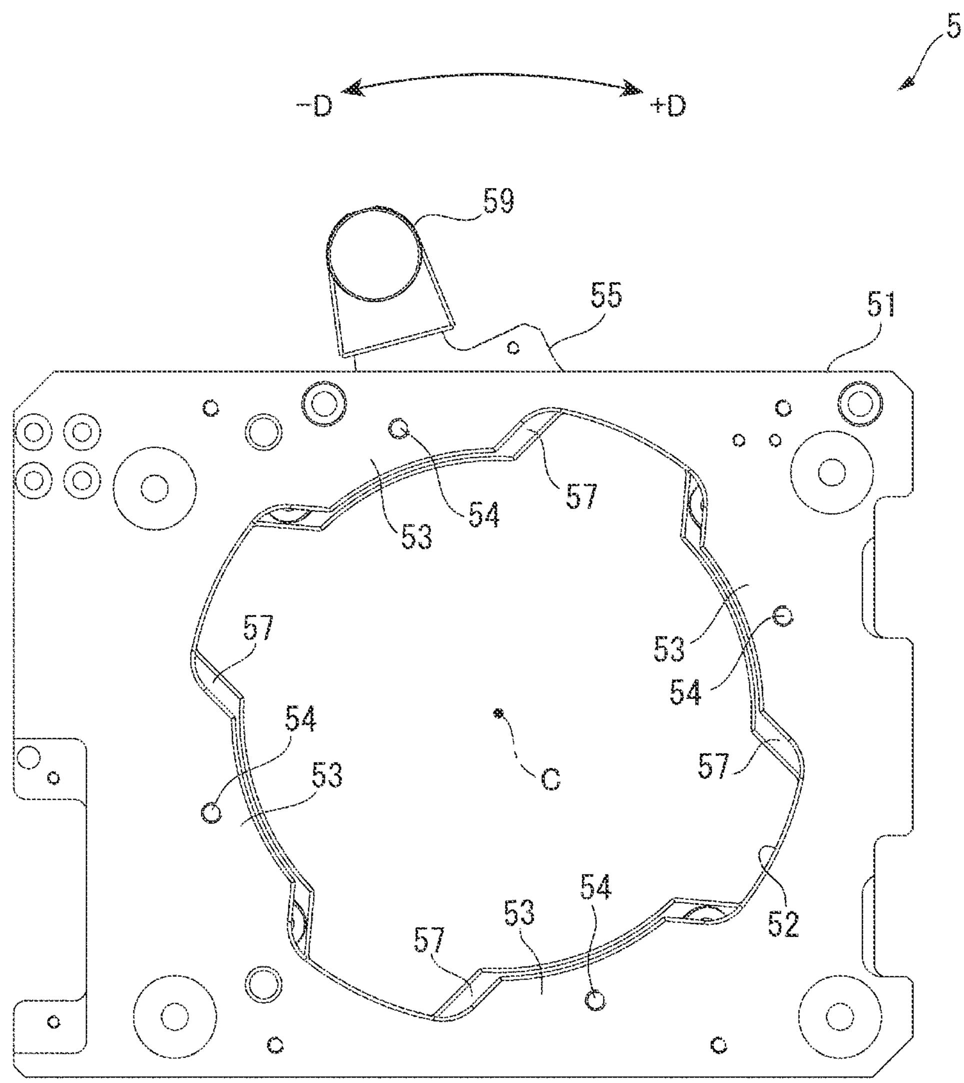
FIG. 5 is a diagram of an attachment mechanism in a release state according to the embodiment viewed from an emission side of image light.
Figure 6:
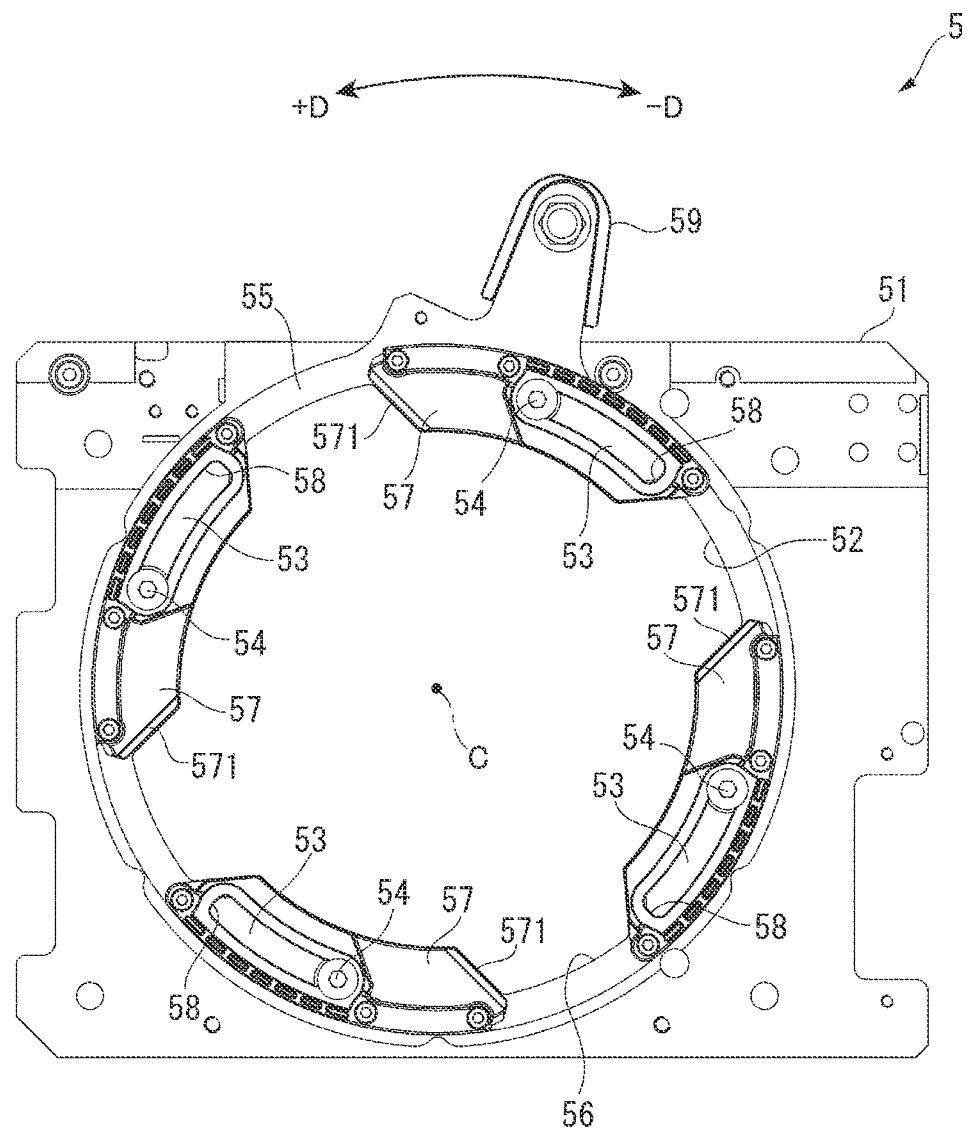
FIG. 6 is a view of the attachment mechanism in the release state according to the embodiment viewed from an incident side of the image light.
Figure 7:
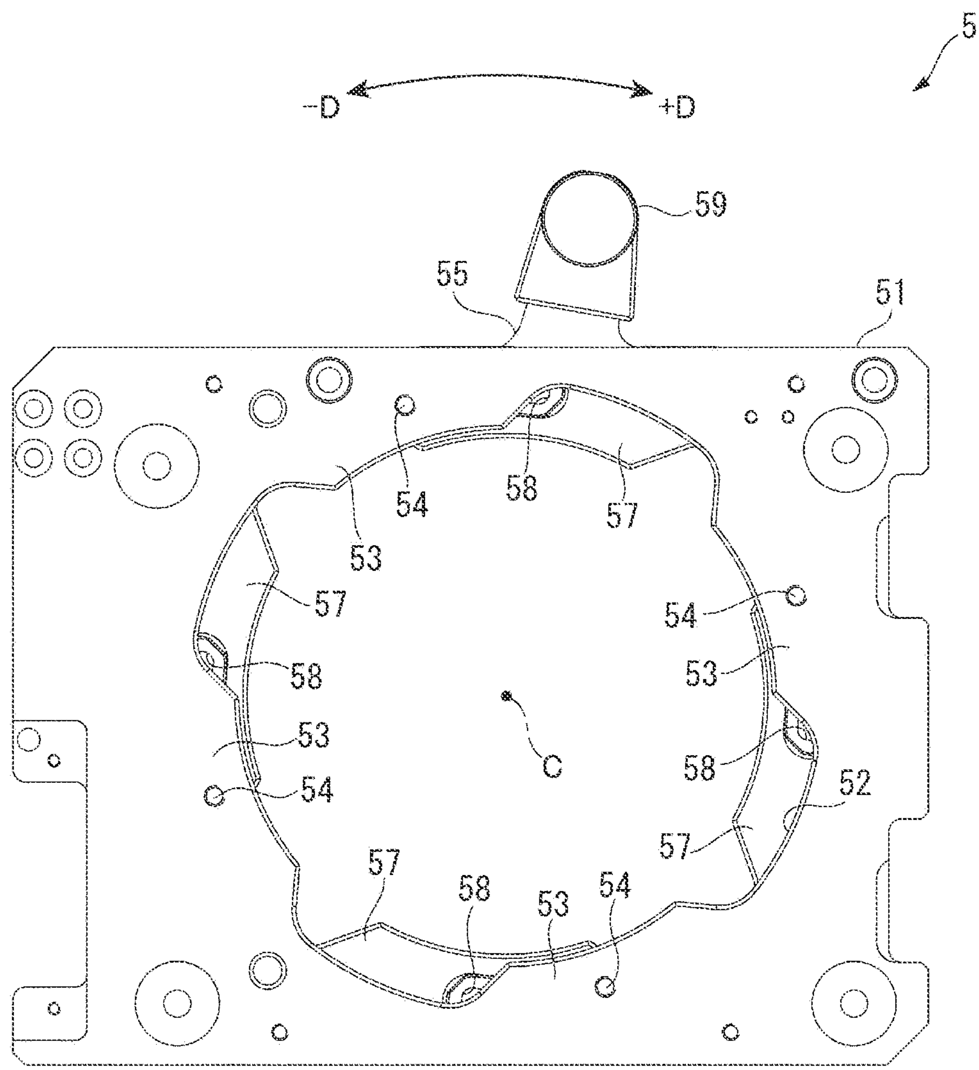
FIG. 7 is a diagram of the attachment mechanism in a lock state according to the embodiment viewed from the emission side of the image light.
Figure 8:
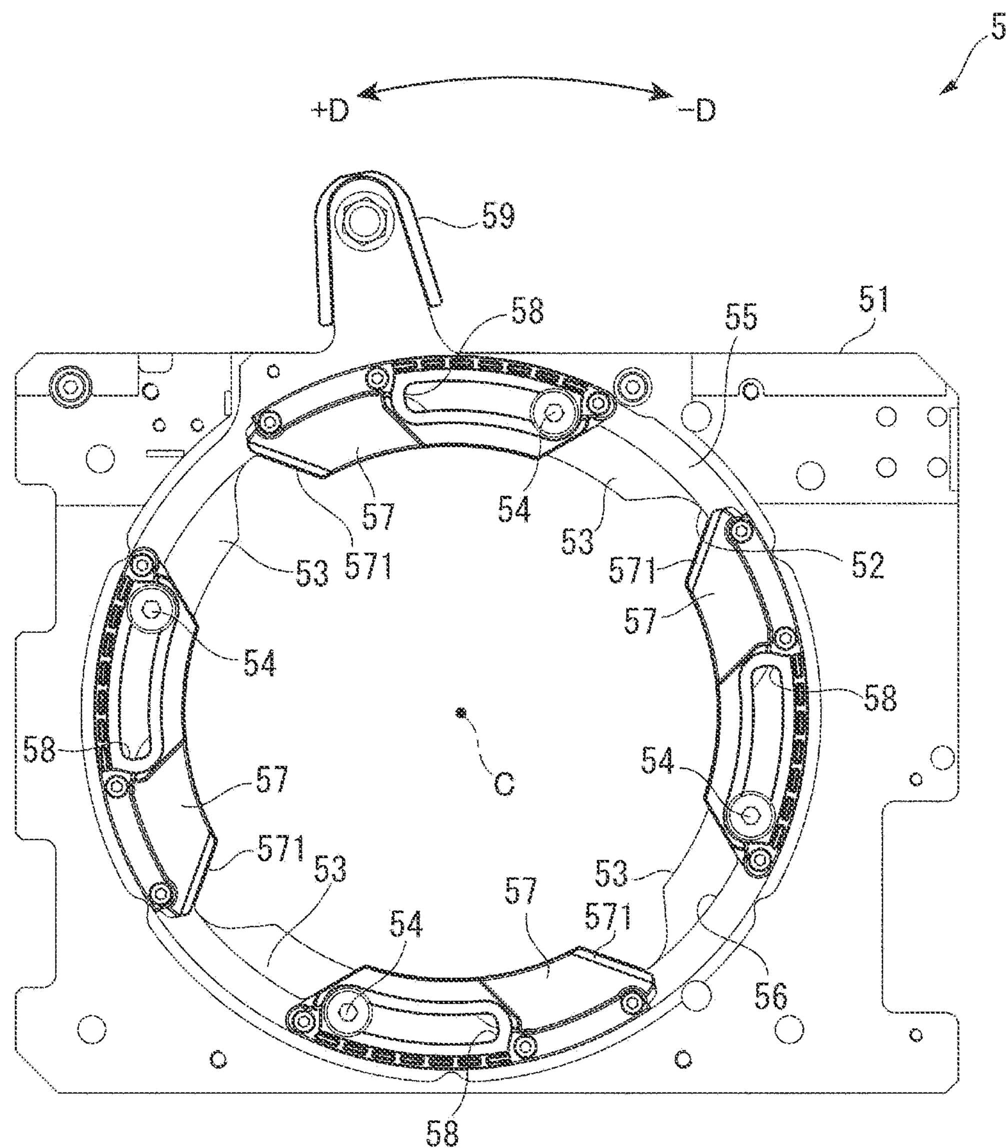
FIG. 8 is a diagram of the attachment mechanism in the lock state according to the embodiment viewed from the incident side of the image light.

FIG. 5 is a diagram of the attachment mechanism 5 in a release state viewed from an emission side of image light. FIG. 6 is a diagram of the attachment mechanism 5 in the release state viewed from an incident side of the image light. FIG. 7 is a diagram of the attachment mechanism 5 in a lock state viewed from the emission side of the image light. FIG. 8 is a diagram of the attachment mechanism 5 in the lock state viewed from the incident side of the image light.

The attachment mechanism 5 is provided in the light emitting device 11 and detachably holds the attached projection optical device 6. That is, the projection optical device 6 is detachably attached to the attachment mechanism 5. The attachment mechanism 5 includes, as shown in FIGS. 5 to 8, a substrate 51 and a turning member 55.

Configuration of the Substrate

The substrate 51 supports the turning member 55 to be capable of turning centering on the center axis CX of the projection optical device 6 to be attached. The substrate 51 is formed in a rectangular shape long in the +X direction when viewed from the +Z direction. The substrate 51 includes an opening section 52, a projecting section 53, and an inserting section 54.

The opening section 52 is a circular opening section piercing through the substrate 51 along the +Z direction in the center of the substrate 51. A center C of the opening section 52 when viewed from the +Z direction coincides with the center axis CX at the time when the project on optical device 6 is attached to the attachment mechanism 5.

In the following explanation, a clockwise direction centering on the center C of the opening section 52 viewed from the +Z direction is represented as a +D direction and a counterclockwise direction centering on the center C is represented as a −D direction. In other words, a counterclockwise direction centering on the center C of the opening section 52 viewed from the −Z direction is represented as the +D direction and a clockwise direction centering on the center C is represented as the −D direction.

The projecting section 53 projects toward the inner side of the opening section 52 from the inner edge of the opening section 52 when viewed from the +Z direction or the −Z direction. A plurality of projecting sections 53 are provided in the substrate 51. In this embodiment, four projecting sections 53 are provided at equal intervals along the inner edge of the opening section 52.

The inserting section 54 is provided in each of the plurality of projecting sections 53. That is, a plurality of inserting sections are provided. The inserting section 54 is a pin inserted into a guide section 58 of the turning member 55 to guide a turn of the turning member 55 centering on the center C. That is, the inserting section 54 guides the turn of the turning member 55 centering on the center axis CX in conjunction with the guide section 58.

A diameter expanded section is provided at the distal end of the inserting section 54. Consequently, a drop of the turning member 55 from the substrate 51 is suppressed.

Configuration of the Turning Member

The turning member 55 is formed in a ring shape as shown in FIGS. 6 and 8. The turning member 55 is concentric with the opening section 52 and is provided such that the inner edge of the turning member 55 substantially coincides with the inner edge of the opening section 52. The turning member 55 is supported by the substrate 51 to be capable of turning centering on the center axis CX. The turning member 55 includes an opening section 56, a holding section 57, a guide section 58, and an operation section 59.

The opening section 56 is formed in a substantially circular shape in the center of the turning member 55 when viewed from the −Z direction. The center or the opening section 56 coincides with the center C of the opening section 52 when viewed from the −Z direction.

The holding section 57 is a part sandwiched by the fixing device 7 and is a part that holds the fixing device 7 and the projection optical device 6. The holding section 57 is a projecting section disposed on the surface in the −Z direction in the turning member 55 and projecting to the inner side of the opening section 56 when viewed from the Z direction. In this embodiment, four holding sections 57 are provided at equal intervals in the circumferential direction of the turning member 55.

When a state of the attachment mechanism 5 is the release state, the holding section 57 is disposed in a position overlapping the projecting section 53 when viewed from the −Z direction. On the other hand, when the state of the attachment mechanism 5 is the lock state, the holding section 57 projects in the +D direction from the projecting section 53. As explained in detail below, the holding section 57 moves along the guide surface 742B according to a turn of the turning member 55 in the +D direction and is disposed between the pressing section 742 and the contact section 722. The release state is a state in which the projection optical device 6 attached to the attachment mechanism can be detached among states of the attachment mechanism 5. The lock state is a state in which the projection optical device 6 attached to the attachment mechanism 5 is locked among the states of the attachment mechanism 5.

An inclined surface 571 along the guide surface 742B is provided at the distal end portion in the +D direction in the holding section 57.

The guide section 58 is an arcuate long hole centering on the center C. A plurality of guide sections 58 are provided. When the turning member 55 is attached to the substrate 51, the inserting sections 54 corresponding to the guide sections 58 are inserted into the guide sections 58 from the +Z direction. The guide section 58 guides a turn of the turning member 55 in the +D directions centering on the center C.

When the inserting section 54 is located at the end portion in the +D direction in the guide section 58, the holding section 57 is disposed in a position overlapping the projecting section 53 when viewed from the +Z direction or the −Z direction. A state of the attachment mechanism 5 at this time is the release state. On the other hand, when the inserting section 54 is located at the end portion in the −D direction in the guide section 58, the holding section 57 is disposed in a position projecting in the +D direction from the projecting section 53. A state of the attachment mechanism 5 at this time is the lock state. The holding section 57 is disposed between the contact section 722 and the pressing surface 742A and is urged to the contact section 722 side by the pressing section 742.

The operation section 59 is a part operated by a user in the turning member 55. The operation section 59 is a columnar portion provided at the end portion in the +Y direction in the turning member 55 and extends in the +Z direction. The operation section 59 is turned in the +D direction to thereby move the turning member 55 including the holding section 57 in the +D direction and dispose the holding section 57 between the contact section 722 and the pressing mechanism 73.

The turning member 55 is urged in the +D direction by a not-shown urging member such that the lock state is maintained.

Attachment of the Projection Optical Device to the Light Emitting Device

Attachment of the projection optical device 6 to the light emitting device 11 is explained below.

First, the operation section 59 is operated to turn the turning member 55 in the −D direction and set the state of the attachment mechanism 5 to the release state in which the holding section 57 overlaps the projecting section 53.

Thereafter, the projection optical device 6 is disposed with respect to the attachment mechanism 5 such that the pressing sections 742 of the fixing device 7 are located among the four projecting sections 53 in the circumferential direction centering on the center C.

Figure 9:
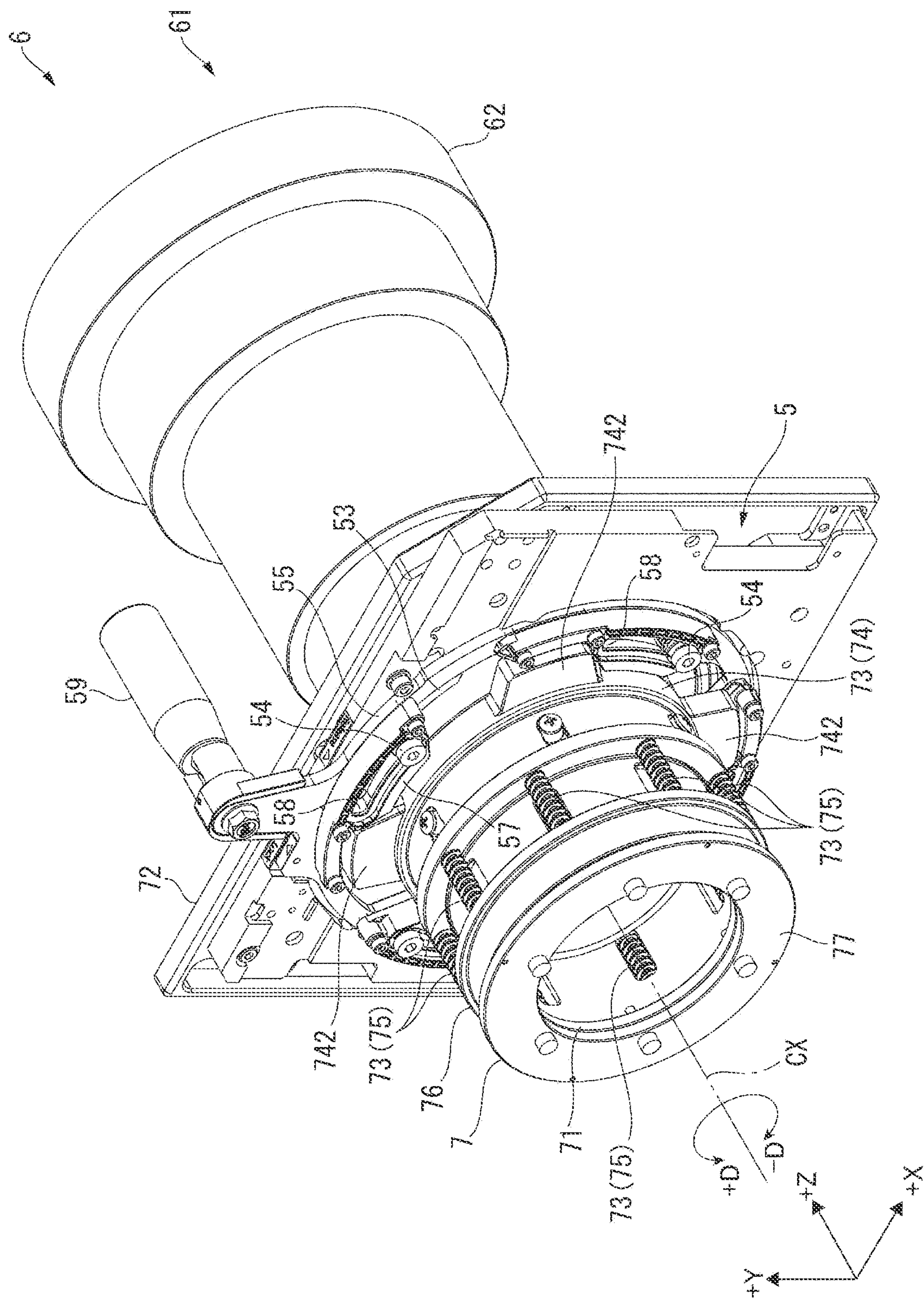
FIG. 9 is a perspective view of the attachment mechanism and the projection optical device in the lock state according to the embodiment viewed from the incident side of the image light.

FIG. 9 is a perspective view of the attachment mechanism 5 and the projection optical device 6 in the lock state viewed from the incident side of the image light.

In this state, when the operation section 59 is operated to turn the turning member 55 in the +D direction, the holding sections 57 move in the +D direction along the guide surfaces 742B of the pressing sections 742 corresponding to the holding sections 57. Consequently, as shown in FIG. 9, the holding sections 57 are disposed between the pressing surfaces 742A of the pressing sections 742 and the contact section 722. At this time, the second tube members 74 including the pressing sections 742 are urged to the contact section 722 side by the urging sections 75. Therefore, the holding sections 57 are sandwiched between the contact section 722 and the pressing sections 742. The fixing device 7 and the projection optical device 6 are fixed to the attachment mechanism 5. A state of the attachment mechanism 5 at this time is the lock state as explained above. As long as the turning member 55 is not turned in the −D direction, detachment of the projection optical device 6 from the attachment mechanism 5 is restricted.

Detachment of the Projection Optical Device from the Light Emitting Device

Detachment of the projection optical device 6 from the light emitting device 11 is explained.

In the attachment mechanism 5 in the lock state, when the operation section 59 is operated to turn the turning member 55 in the −D direction, the holding sections disposed between the pressing sections 742 and the contact section 722 move in the −D direction and are disposed in positions overlapping the projecting sections 53 when viewed from the −Z direction. In this state, since the holding sections 57 are not sandwiched between the pressing sections 742 and the contact section 722, the projection optical device 6 can be moved in the +Z direction with respect to the attachment mechanism 5. The projection optical device 6 can be detached from the attachment mechanism 5. A state of the attachment mechanism 5 at this time is the release state as explained above.

Effects of the Embodiment

The projector 1 according to this embodiment explained above achieves effects explained below.

The projector 1 includes the light emitting device 11 and the projection optical device 6. The light emitting device 11 includes the light source 41, the light modulating device 453 that modulates light emitted from the light source 41, and the attachment mechanism 5 to which the projection optical device 6 is attached. The attachment mechanism 5 includes the holding section 57.

The fixing device 7 configuring the projection optical device 6 fixes, to the light emitting device 11 that emits light, the lens barrel 62 configuring the projection optical device 6 and holding the plurality of lenses 61. The fixing device 7 includes the first tube member 71, the contact section 722, and the pressing mechanism 73. The contact section 722 is provided on the outer side of the first tube member 71 and is in contact with the holding section 57 included in the light emitting device 11. The pressing mechanism 73 is provided to be opposed to the contact section 722. When the fixing device 7 is attached to the light emitting device 11, the pressing mechanism 73 presses the holding section 57 toward the contact section 722.

With such a configuration, the holding section 57 configuring the attachment mechanism 5 of the light emitting device 11 is sandwiched by the contact section 722 and the pressing mechanism 73. Consequently, the fixing device 7 can be attached to the light emitting device 11. Consequently, the fixing device 7, to which the lens barrel 62 is coupled, can be fixed to the light emitting device 11. Therefore, it is possible to cause the light emitting device 11 to stably hold the projection optical device 6.

In the fixing device 7, the pressing mechanism 73 includes the pressing section 742 that comes into contact with the holding section 57 and the urging section 75 that urges the pressing section 742 to the contact section 722 side.

With such a configuration, since the pressing section 742 in contact with the holding section 57 can be urged to the contact section 722 side by the urging section 75, the holding section 57 can be pressed to the contact section 722 side. Therefore, the holding section 57 can be stably sandwiched between the contact section 722 and the pressing section 742.

In the fixing device 7, the pressing section 742 includes the pressing surface 742A and the guide surface 742B. The pressing surface 742A is provided in the position opposed to the contact section 722 and presses the holding section 57. The guide surface 7423 is adjacent to the pressing surface 742A in the circumferential direction centering on the center axis CX of the first tube member 71 and provided continuously to the pressing surface 742A. The guide surface 7423 is inclined with respect to the circumferential direction to further separate from the contact section 722 as being further away from the pressing surface 742A and Guides the holding section 57 to the pressing surface 742A.

With such a configuration, when the fixing device 7 is attached to the attachment mechanism 5 of the light emitting device 11, the holding section 57 moves along the guide surface 742B, whereby the holding section 57 can be guided to between the pressing surface 742A and the contact section 722. Therefore, it is possible to smoothly attach the fixing device 7 and the lens barrel 62 to the light emitting device 11.

In the fixing device 7, the plurality of pressing sections 742 are provided in the circumferential direction centering on the center axis CX of the first tube member 71.

With such a configuration, the holding sections 57 can be sandwiched by the plurality of pressing sections 742. Therefore, the fixing device 7 can be stably to the light emitting device 11. Further, the lens barrel 62 can be stably fixed to the light emitting device 11.

In the fixing device 7, the pressing mechanism 73 includes the second tube member 74. The second tube member 74 is provided on the outer side of the first tube member 71 and is capable of moving along the center axis CX of the first tube member 71. The pressing section 742 projects to the outer side from the second tube member 74. The urging section 75 urges the second tube member 74 to the contact section 722 side.

With such a configuration, the second tube member 74 can be moved along the first tube member 71 by an urging force of the urging section 75. The holding section 57 can be pressed by the pressing section 742 provided in the second tube member 74. Therefore, the pressing section 742 can be stably moved. A pressing force can be stably applied to the holding section 57.

The projection optical device 6 includes the fixing device 7, the plurality of lenses 61, and the lens barrel 62 holding the plurality of lenses 61 and attached to the fixing device 7.

In other words, the projection optical device 6 is detachably attached to the light emitting device 11 that emits light. The projection optical device 6 includes the plurality of lenses 61, the lens barrel 62, the contact section 722, and the pressing mechanism 73. The lens barrel 62 holds the plurality of lenses 61. The contact section 722 comes into contact with the holding section 57 included in the attachment mechanism 5 of the light emitting device 11. The pressing mechanism 73 is provided to be opposed to the contact section 722. When the projection optical device 6 is attached to the attachment mechanism 5 of the light emitting device 11, the pressing mechanism 73 presses the holding section 57 toward the contact section 722.

With such a configuration, it is possible to achieve the same effects as the effects of the fixing device Consequently, the projection optical device 6 can be stably fixed to the attachment mechanism 5 of the light emitting device 11.

In the projector 1, the attachment mechanism 5 includes the operation section 59 that moves the holding section 57 and disposes the holding section 57 between the contact section 722 and the pressing mechanism 73.

With such a configuration, by operating the operation section 59, it is possible to switch a state in which the holding section 57 is disposed between the contact section 722 and the pressing mechanism 73 and a state in which the holding section 57 is not disposed between the contact section 722 and the pressing mechanism 73. That is, it is possible to switch a state in which the attachment mechanism 5 holds the projection optical device 6 and a state in which the attachment mechanism 5 does not hold the projection optical device 6. Consequently, it is possible to detachably attach the projection optical device 6 to the light emitting device 11. Therefore, it is possible to easily replace the projection optical device 6.

Modifications of the Embodiment

The present disclosure is not limited to the embodiment. Modifications, improvements, and the like in a range in which the object of the present disclosure can be achieved are included in the present disclosure.

In the embodiment, the first tube member 71 is the cylindrical member. However, the shape of the first rube member 71 may not be a perfect cylindrical shape and may be a part of a cylindrical shape, that is, an arcuate shape when viewed from the +Z direction or the −Z direction. The shape of the first tube member 71 is not limited to the cylindrical shape and may be a polygonal cylindrical shape.

In the embodiment, the fixing device 7 includes the frame member 72 provided on the outer side of the first tube member 71. However, the frame member 72 is not limited to be configured as a separate member from the first tube member 71 and fixed to the first tube member 71 and may be configured integrally with the first tube member 71.

In the embodiment, the contact section 722 is provided in the part opposed to the pressing mechanism 73 in the frame member 72. However, not only this, but the contact section 722 may be provided separately from the frame member 72.

In the embodiment, the pressing mechanism 73 includes the second tube member 74 including the pressing section 742 that comes into contact with the holding section 57 and the urging section 75 that urges the pressing section 742 to the contact section 722 side. However, not only this, but the configuration of the pressing mechanism 73 can be changed as appropriate if the pressing mechanism 73 can cause a pressing force to the contact section 722 side to act on the holding section 57.

In the embodiment, the pressing section 742 is provided in the second tube member 74 provided on the outer side of the first tube member 71 and concentrically with the first tube member 71. However, not only this, but the pressing section 742 may not be provided in the second tube member 74 if the urging section 75 can urge the pressing section 742.

The urging section 75 is the compression coil spring. However, not only this, but the urging section 75 may be configured by another urging member such as a tension coil spring or an elastic body if the urging section 75 can cause the urging force to act on the pressing section 742.

In the embodiment, the pressing section 742 includes the pressing surface 742A and the guide surface 742B. However, not only this, but the guide surface 742B may be absent. Similarly, the inclined surface 571 is provided at the distal end portion in the +D direction in the holding section 57. However, not only this, but the inclined surface 571 may be absent.

In the embodiment, the plurality of pressing sections 742 are provided in the circumferential direction centering on the center axis CX of the first tube member 71. However, not only this, but the number and the disposition of the pressing sections 742 can be changed as appropriate if the holding sections 57 can be sandwiched between the contact section 722 and the pressing sections 742 and the projection optical device 6 can be stably held by the attachment mechanism 5 by sandwiching the holding sections 57. The projection optical device 6 is more stably held by the attachment mechanism 5 by disposing three or more pressing sections 742 at equal intervals in the circumferential direction centering on the center axis CX.

In the embodiment, the projection optical device 6 includes the plurality of lenses 61, the lens barrel 62 that holds the plurality of lenses 61, and the fixing device 7. A part in the −Z direction in the lens barrel 62 is disposed in the first tube member 71 of the fixing device 7. However, not only this, but the fixing device 7 only has to be provided in the lens barrel 62 and may not house a part of the lens barrel 62 on the inside. The fixing device 7 may be provided in the +Z direction from the center in the +Z direction in the lens barrel 62. In other words, the contact section 722 and the pressing mechanism 73 may be provided in the +Z direction from the center the +Z direction in the lens barrel 62. In this case, light emitted from the lens barrel 62 may be projected to the outside of the projection optical device 6 passing through the through-opening 711 of the first tube member 71.

In the embodiment, the operation section 59 is operated, whereby the holding section 57 is capable of moving between the position where the holding section 57 is disposed between the contact section 722 and the pressing mechanism 73 and the position where the holding section 57 is not disposed between the contact section 722 and the pressing mechanism 73. However, not only this, but the state in which the holding section 57 is disposed between the contact section 722 and the pressing mechanism 73 and the state in which the holding section 57 is not disposed between the contact section 722 and the pressing mechanism 73 may be switched by turning the fixing device 7 centering on the center axis CX. That is, the holding section 57 may not always be moved.

A moving direction of the holding section 57 is not limited to the +D directions centering on the center C and may be a direction orthogonal to an axis parallel to the center axis CX. For example, the attachment mechanism 5 may be configured such that, when the projection optical device 6 is attached to the light emitting device 11, the holding section 57 is moved in +Y directions or +X directions, whereby the holding section 57 is disposed between the contact section 722 and the pressing mechanism 73.

In the embodiment, the attachment mechanism 5 includes the operation section 59 that turns the turning member 55 and moves the holding section 57 in the +D directions. However, not only this, but the operation section 59 may be absent. In this case, the turning member 55 may be turned, for example, using driving means such as a motor that is driven according to operation by the user.

The holding section 57 may be directly moved by the driving means.

Further, the holding section 57 may not be provided in the ring-like turning member 55. A configuration including the holding section 57 can be changed as appropriate. That is, the holding section 57 only has to be provided in the light emitting device 11 to be capable of being disposed between the contact section 722 and the pressing mechanism 73.

In the embodiment, the projector 1 includes three light modulating devices 453B, 453G, and 453R. However, not only this, but the present disclosure is also applicable to a projector including two or less or four or more light modulating devices.

In the embodiment, in the image generating device 4, optical components are disposed in a layout shown in FIG. 1. However, not only this, but, in the image generating device 4, the optical components may be disposed in another layout or the image generating device 4 may include optical components other than the optical components shown in FIG. 1.

In the embodiment, the light modulating device 453 includes the transmission-type liquid crystal panel, a light incident surface and a light emission surface of which are different. However, not only this, but the light modulating device 453 may include a reflection-type liquid crystal panel, a light incident surface and a light emission surface of which are the same. A light modulating device other than liquid crystal such as a light modulating device making use of a device including a micromirror, for example, a DMD (Digital Micromirror Device) may be used if the light modulating device is capable of modulating an incident light beam and forming an image corresponding to image information.

Overview of the Present Disclosure

An overview of the present disclosure is noted below.

A fixing device according to a first aspect of the present disclosure is a fixing device that fixes, to a light emitting device that emits light, a lens barrel included in a projection optical device and holding a plurality of lenses, the fixing device including: a first tube member; a contact section provided on an outer side of the first tube member and in contact with a holding section included in the light emitting device; and a pressing mechanism provided to be opposed to the contact section and configured to press the holding section toward the contact section when the fixing device is attached to the light emitting device.

With such a configuration, the holding section of the light emitting device is sandwiched by the contact section and the pressing mechanism. Consequently, the fixing device can be attached to the light emitting device. Therefore, it is possible to fix the lens barrel to the light emitting device by integrating the fixing device and the lens barrel.

In the first aspect, the pressing mechanism may include: a pressing section configured to come into contact with the holding section; and an urging section configured to urge the pressing section to the contact section side.

With such a configuration, since the pressing in contact with the holding section can be urged to the contact section side by the urging section, the holding section can be pressed to the contact section side. Therefore, the holding section can be stably sandwiched between the contact section and the pressing section.

In the first aspect, the pressing section may include: a pressing surface provided in a position opposed to the contact section and configured to press the holding section; and a guide surface adjacent to the pressing surface in a circumferential direction centering on a center axis of the first tube member and provided continuously to the pressing surface and configured to guide the holding section to the pressing surface, and the guide surface may be inclined with respect to the circumferential direction to further separate from the contact section as being further apart from the pressing surface.

With such a configuration, when the fixing device is attached to the light emitting device and the holding section moves to be inserted between the contact section and the pressing section, the holding section can be guided to between the pressing surface and the contact section by moving along the guide surface. Therefore, it is possible to smoothly attach the fixing device and the lens barrel to the light emitting device.

In the first aspect, a plurality of the pressing sections may be provided in a circumferential direction centering on a center axis of the first tube member.

With such a configuration, the holding section can sandwiched by the plurality of pressing sections. Therefore, the fixing device can be stably fixed to the light emitting device and the lens barrel can be stably fixed to the light emitting device.

In the first aspect, the pressing mechanism may include a second tube member provided on an outer side of the first tube member and capable of moving along a center axis of the first tube member, the pressing section may project to the outer side from the second tube member, and the urging section may urge the second tube member to the contact section side.

With such a configuration, the second tube member can be moved along the first tube member by an urging force of the urging section. The holding section can be pressed by the pressing section provided in the second tube member. Therefore, the pressing section can be stably moved. A pressing force can be stably applied to the holding section.

A projection optical device according to a second aspect of the present disclosure includes: the fixing device according to the first aspect; a plurality of lenses; and a lens barrel holding the plurality of lenses and attached to the fixing device.

With such a configuration, it is possible to achieve the same effects as the effects of the fixing device according to the first aspect. Consequently, the projection optical device can be stably fixed to the light emitting device.

A projection optical device according to a third aspect of the present disclosure is a projection optical device detachably attached to a light emitting device that emits light, the projection optical device including: a plurality of lenses; a lens barrel holding the plurality of lenses; a contact section in contact with a holding section included in the light emitting device; and a pressing mechanism provided to be opposed to the contact section and configured to press the holding section toward the contact section when the projection optical device is attached to the light emitting device.

With such a configuration, it is possible to achieve the same effects as the effects of the projection optical device according to the second aspect.

A projector according to a fourth aspect of the present disclosure includes: a light emitting device configured to emit light; and the projection optical device according to the third aspect. The light emitting device includes: a light source; a light modulating device configured to modulate light emitted from the light source; and an attachment mechanism including a holding section, the projection optical device being attached to the attachment mechanism.

With such a configuration, it is possible to achieve the same effects as the effects of the projection optical device according to the second aspect and the third aspect. Consequently, it is possible to cause the light emitting device to stably hold the projection optical device.

In the fourth aspect, the attachment mechanism may include an operation section configured to move the holding section and dispose the holding section between the contact section and the pressing mechanism.

With such a configuration, by operating the operation section, it is possible to switch a state in which the holding section is disposed between the contact section and the pressing mechanism and a state in which the holding section is not disposed between the contact section and the pressing mechanism. That is, it is possible to switch a state in which the attachment mechanism holds the projection optical device and a state in which the attachment mechanism does not hold the projection optical device. Consequently, the projection optical device can be detachably attached to the light emitting device. Therefore, it is possible to easily replace the projection optical device.

What is claimed is:

1. A fixing device that fixes, to a light emitting device that emits light, a lens barrel included in a projection optical device and holding a plurality of lenses, the fixing device comprising:

a first tube member;

a contact section provided on an outer side of the first tube member and in contact with a holding section included in the light emitting device;

a pressing mechanism provided to be opposed to the contact section and configured to press the holding section toward the contact section when the fixing device is attached to the light emitting device; wherein the pressing mechanism includes:

a pressing section configured to come into contact with the holding section, the pressing section includes:

a pressing surface provided in a position opposed to the contact section and configured to press the holding section;

a guide surface adjacent to the pressing surface in a circumferential direction centering on a center axis of the first tube member and provided continuously to the pressing surface and configured to guide the holding section to the pressing surface; and the guide surface is inclined with respect to the circumferential direction to further separate from the contact section as being further apart from the pressing surface; and an urging section configured to urge the pressing section to a contact section side.

2. The fixing device according to claim 1, wherein a plurality of the pressing sections are provided in a circumferential direction centering on a center axis of the first tube member.

3. The fixing device according to claim 1, wherein the pressing mechanism includes a second tube member provided on an outer side of the first tube member and capable of moving along a center axis of the first tube member, the pressing section projects to the outer side from the second tube member, and the urging section urges the second tube member to the contact section side.

4. A projection optical device comprising:

the fixing device according to claim 1;

a plurality of lenses; and a lens barrel holding the plurality of lenses and attached to the fixing device.

5. A projection optical device detachably attached to a light emitting device that emits light, the projection optical device comprising:

a plurality of lenses;

a lens barrel holding the plurality of lenses;

a contact section in contact with a holding section included in the light emitting device; and a pressing mechanism provided to be opposed to the contact section and configured to press the holding section toward the contact section when the projection optical device is attached to the light emitting device; wherein the pressing mechanism includes:

a pressing section configured to come into contact with the holding section, the pressing section includes:

a pressing surface provided in a position opposed to the contact section and configured to press the holding section;

a guide surface adjacent to the pressing surface in a circumferential direction centering on a center axis of a first tube member and provided continuously to the pressing surface and configured to guide the holding section to the pressing surface, and the guide surface is inclined with respect to the circumferential direction to further separate from the contact section as being further apart from the pressing surface; and an urging section configured to urge the pressing section to a contact section side.

6. A projector comprising:

a light emitting device configured to emit light; and the projection optical device according to claim 4, wherein the light emitting device includes:

a light source;

a light modulating device configured to modulate light emitted from the light source; and an attachment mechanism including a holding section, the projection optical device being attached to the attachment mechanism.

7. The projector according to claim 6, wherein the attachment mechanism includes an operation section configured to move the holding section and dispose the holding section between the contact section and the pressing mechanism.

8. A fixing device that fixes, to a light emitting device that emits light, a lens barrel included in a projection optical device and holding a plurality of lenses, the fixing device comprising:

a first tube member;

a contact section provided on an outer side of the first tube member and in contact with a holding section included in the light emitting device; and a pressing mechanism provided to be opposed to the contact section and configured to press the holding section toward the contact section when the fixing device is attached to the light emitting device; wherein the pressing mechanism includes:

a second tube member provided on an outer side of the first tube member and capable of moving along a center axis of the first tube member;

a pressing section configured to come into contact with the holding section, the pressing section projects to the outer side from the second tube member;

an urging section configured to urge the pressing section to a contact section side, the urging section urges the second tube member to the contact section side.

9. The fixing device according to claim 8, wherein the pressing section includes:

a pressing surface provided in a position opposed to the contact section and configured to press the holding section; and a guide surface adjacent to the pressing surface in a circumferential direction centering on a center axis of the first tube member and provided continuously to the pressing surface and configured to guide the holding section to the pressing surface, and the guide surface is inclined with respect to the circumferential direction to further separate from the contact section as being further apart from the pressing surface.

10. The fixing device according to claim 8, wherein a plurality of the pressing sections are provided in a circumferential direction centering on a center axis of the first tube member.

11. A projection optical device comprising:

the fixing device according to claim 8;

a plurality of lenses; and a lens barrel holding the plurality of lenses and attached to the fixing device.

12. A projection optical device detachably attached to a light emitting device that emits light, the projection optical device comprising:

a plurality of lenses;

a lens barrel holding the plurality of lenses;

a contact section in contact with a holding section included in the light emitting device; and a pressing mechanism provided to be opposed to the contact section and configured to press the holding section toward the contact section when the projection optical device is attached to the light emitting device; wherein the pressing mechanism includes:

a second tube member provided on an outer side of a first tube member and capable of moving along a center axis of the first tube member;

a pressing section configured to come into contact with the holding section, the pressing section projects to the outer side from the second tube member;

an urging section configured to urge the pressing section to a contact section side, the urging section urges the second tube member to the contact section side.

13. A projector comprising:

a light emitting device configured to emit light; and the projection optical device according to claim 11, wherein the light emitting device includes:

a light source;

a light modulating device configured to modulate light emitted from the light source; and an attachment mechanism including a holding section, the projection optical device being attached to the attachment mechanism.

14. The projector according to claim 13, wherein the attachment mechanism includes an operation section configured to move the holding section and dispose the holding section between the contact section and the pressing mechanism.

* * * * *